United States Patent [19]

Ridgway

[11] 4,441,321

[45] Apr. 10, 1984

[54] COMPACT MIST FLOW POWER GENERATOR

[75] Inventor: Stuart L. Ridgway, Santa Monica, Calif.

[73] Assignee: R & D Associates, Marina del Rey, Calif.

[21] Appl. No.: 361,863

[22] Filed: Mar. 25, 1982

[51] Int. Cl.³ .............................................. F03G 7/04
[52] U.S. Cl. .................................... 60/641.7; 60/675; 417/52
[58] Field of Search .................... 60/398, 641.6, 641.7, 60/688, 689, 675; 417/52, 65

[56] References Cited

U.S. PATENT DOCUMENTS

| | | | |
|---|---|---|---|
| 3,967,449 | 7/1976 | Beck | 60/641.7 |
| 3,995,160 | 11/1976 | Zener et al. | 60/641.7 X |
| 4,216,657 | 8/1980 | Ridgway | 60/641.7 |

Primary Examiner—Allen M. Ostrager
Assistant Examiner—Stephen F. Husar
Attorney, Agent, or Firm—Poms, Smith, Lande & Rose

[57] ABSTRACT

An ocean thermal energy converter (OTEC) generates electricity from warm surface water in dropping 100 meters or so, and then raises it back to the surface using its own thermal energy in a large floating vacuum chamber. The mist flow process as described in U.S. Pat. No. 4,216,657 is employed to accelerate water droplets and water vapor upward from the bottom of the chamber under a pressure difference created by spraying cold water from lower ocean levels into the same chamber. The cold water is sprayed upward and parallel to the upper side walls of the chamber to control the flow of the warm droplets, as well as condense the vapor. This cold spray has too small an initial velocity to reach the top of the chamber, but receives momentum from the accelerated warm droplets. The warm water may be injected substantially vertically or alternatively at an angle inclined toward the axis of the chamber to assist in coalescing and concentrating the stream after the individual droplets have been accelerated upward.

19 Claims, 7 Drawing Figures

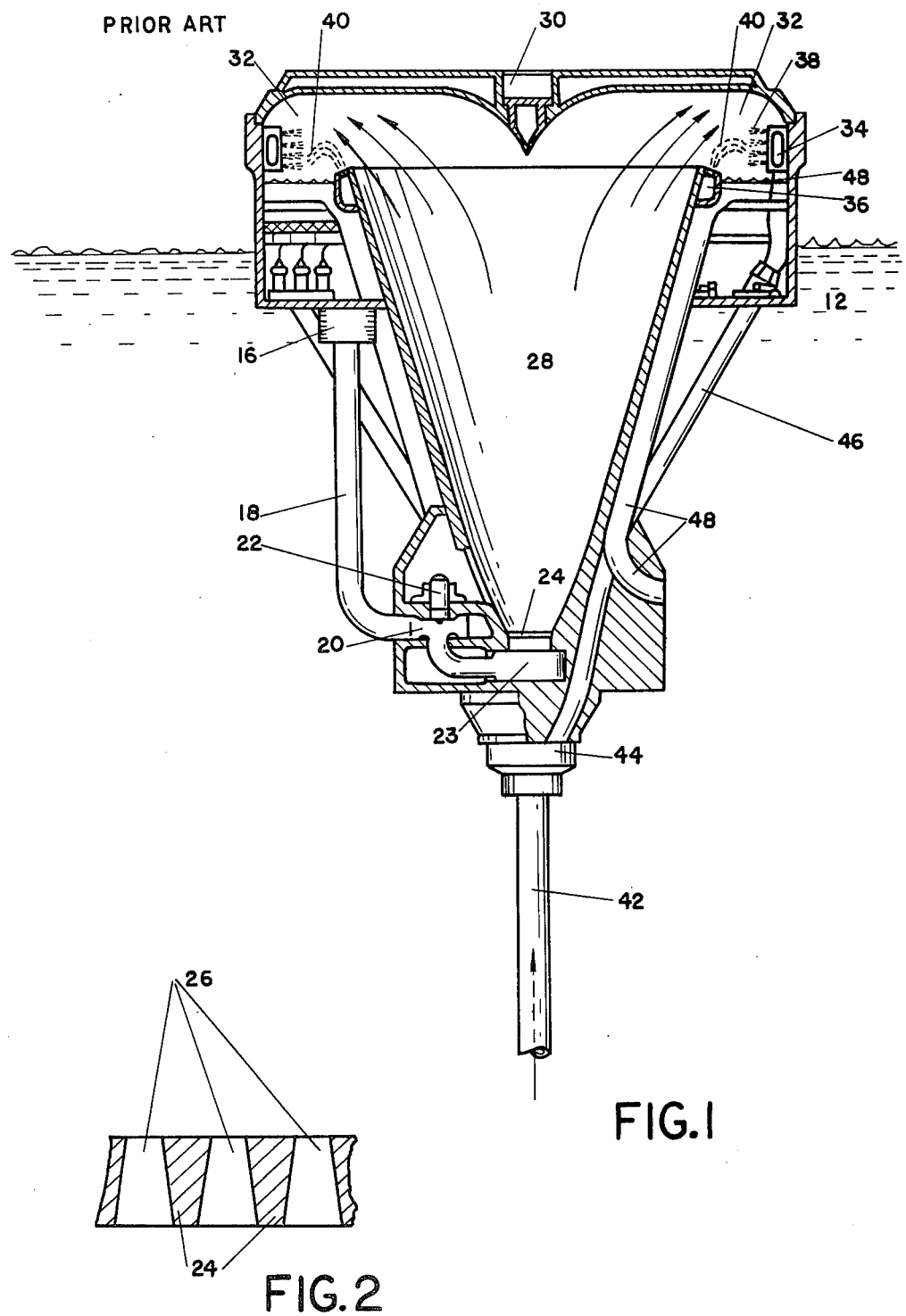

COMPACT MIST FLOW POWER GENERATOR

FIELD OF THE INVENTION

The present invention relates to mist flow type ocean thermal energy converter apparatus.

BACKGROUND OF THE INVENTION

As set forth in some detail in U.S. Pat. No. 4,216,657, assigned to the assignee of the present invention, the difference in temperature between the surface waters and the subsurface waters in certain oceans and lakes, for example, may be harnessed to produce electrical energy by providing a large floating structure which is evacuated and which draws warm water from the surface of the ocean at a temperature of perhaps 20 or 25 degrees Centigrade, and cold water (5 degrees Centigrade) from a few hundred meters below the surface of the ocean. The warm water is initially directed from a point near the surface of the ocean to a hydraulic electric generator located toward the bottom of the floating structure perhaps 100 to 150 meters below the surface of the ocean. The warm water is then sprayed upward into the bottom of an evacuated chamber, with the spray nozzle plate being designed to produce small uniform evenly spaced droplets. Evaporation or boiling from the surface of the droplets produces a large volume of water vapor which rises rapidly toward the top of the chamber, sweeping the droplets with it. The top of the vessel connects to a spray condenser fed by cold sea water pumped up to the top of the chamber, with the cold water being taken from below the thermocline, perhaps 300 or more meters below the surface of the ocean.

Experimental tests indicated that the mist flow process operated satisfactorily. However, the size of the required floating reinforced concrete structure would have been larger than desirable, with the continuous funnel shaped expansion of the cross section of the unit from bottom to top. In addition, the need for providing equipment to pump the cold water to the top of the structure increased the cost of the structure substantially.

Accordingly, objects of the present invention include reducing the size and the cost, and increasing the efficiency of mist flow type thermal energy converters.

SUMMARY OF THE INVENTION

In accordance with the present invention, mist flow type thermal energy converters are provided with arrangements for spraying water droplets or a sheet of water upward into a tall evacuated chamber at an angle inclined toward the axis of the chamber, with said droplets initially having insufficient velocity along the axis of the chamber to reach the upper end thereof.

In accordance with additional aspects of the invention, the following features may be included:

1. The apparatus may be formed with an initial expanding section where the droplets of warm water are fully accelerated to a velocity sufficient to coast to the top of the evacuated chamber, and arrangements may be provided for condensing or removing the water vapor at any point above this section of the chamber.

2. Cold water may be sprayed into an upper section of the evacuated chamber parallel to but spaced from the walls thereof, to both condense the water vapor and also to concentrate and coalesce the upwardly directed water droplets.

3. The pump for the cold water used for condensing the water vapor may be dispensed with, thus reducing the cost as compared with the system of U.S. Pat. No. 4,216,657.

4. The cold water as it is being sprayed into the upper portion of the chamber will pick up additional kinetic energy from the accelerated water droplets, so that the resultant coalesced droplets involving a combination of warm water sprayed in at the bottom of the chamber and cold water sprayed in part way up the chamber, will have sufficient upward velocity to reach a level above the surface of the ocean.

5. The input warm water spray at the bottom of the chamber may be located in a series of space zones, or in a continuous annular spray origination area, with the acceleration zones at the bottom of the chamber being spaced apart, but with the droplets being directed upward and inwardly at a slight angle toward the axis of the evacuated chamber so that, above the acceleration zone, merging and droplet coalescence occurs, to facilitate concentration of the water at the top of the structure.

6. In land based systems, following the initial upward acceleration from the bottom of the chamber, when the upwardly directed coalescing water droplets are coasting toward the top of the chamber, the water vapor may be drawn off by a suitable duct arrangement without interfering with the upward movement of the coalescing droplets.

Other objects, features and advantages of the invention will become apparent from a consideration of the following detailed description and from the accompanying drawings.

BRIEF DESCRIPTION OF THE DRAWINGS

FIG. 1 is a showing of the mist flow electric power generator as disclosed in U.S. Pat. No. 4,216,657, granted Aug. 12, 1980;

FIG. 2 is a detailed cross-sectional showing of a mist flow spray generator plate which may be employed toward the bottom of the unit of FIG. 1;

DETAILED DESCRIPTION

Figure 3A:
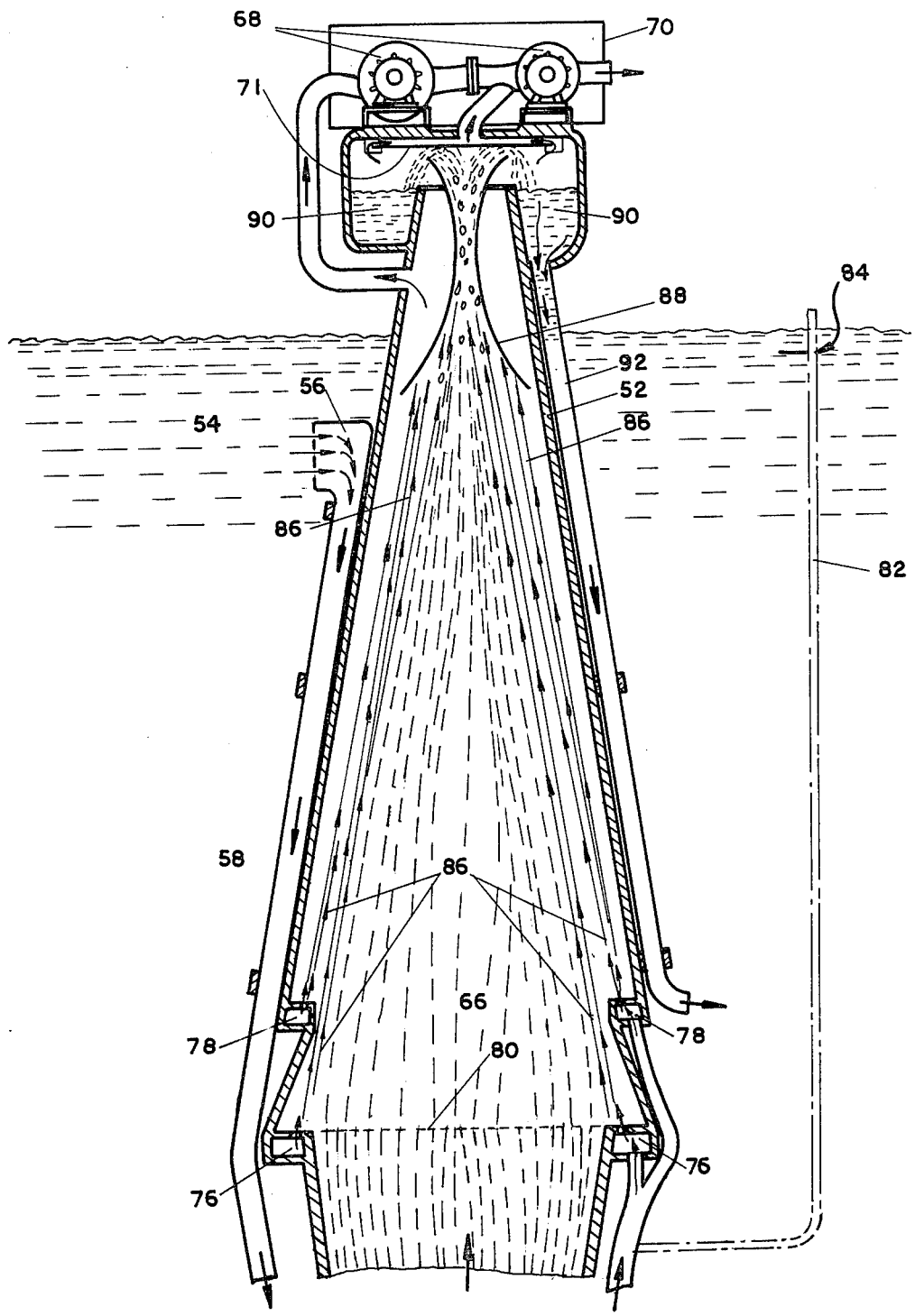
FIGS. 3A and 3B together show a new form of mist flow generator illustrating the principles of the present invention.

Referring more particularly to the drawings, FIG. 1 represents a prior art mist flow ocean thermal energy converter as disclosed in the prior U.S. Pat. No. 4,216,657 granted Aug. 12, 1980, and assigned to the assignee of this invention. In FIG. 1, the reference numeral 12 represents the tropical ocean. The temperature near the surface of the body of water 12 will be assumed to be in the order of 77 degrees Fahrenheit or about 25 degrees centigrade. At substantial depths in many large bodies of water, the temperature approaches freezing and is in the order of about 5 degrees centigrade or about 41 degrees Fahrenheit. In order to reach temperatures which are this low, it is necessary to draw water from several hundred meters or more below the surface of the ocean, sometimes as much as 500 or 1000 meters deep. The foregoing discussion of temperatures was considered appropriate in view of the fact that the system of the present invention in one embodiment utilizes the significant difference between the temperature of the warm surface waters and the relatively cold water at ocean depths to generate electricity. In addition to tropical ocean waters, there are a number of large bodies of fresh water such as the Great Lakes, which exhibit substantial differences between the temperature of the surface water and those at great depths in the lakes. Warm waste water from certain industrial plants or processes may also be used, as developed hereinbelow.

It is noted in passing that the present portion of this specification relates primarily to the mist flow system as shown in the prior patent cited hereinabove, and for those familiar with the operation of that type of structure, it may be appropriate to proceed to a review of FIG. 3 and the following figures of the drawings.

Returning to FIG. 1, warm sea water is drawn from near the surface of the body of water 12 through an inlet 16 and falls through the penstock 18 and then drives the conventional turbine 20 and electric generator 22. The warm water then enters the plenum 23 feeding the mist generator 24. The mist generator is preferably in the form of an apertured plate of the type shown in greater detail in FIG. 2. More specifically, the small apertures 26 in the plate 24 may be in the order of four thousandths of an inch in diameter at their smaller diameter ends and approximately seven thousandths of an inch at the larger diameter end, with the plate thickness being in the order of ten thousandths of an inch.

At the lower end of the chamber 28, the warm water is sprayed upward, with small, uniform, evenly spaced droplets. With the chamber 28 being substantially evacuated by the large vacuum pump 30, evaporation or boiling from the surface of the droplets sprayed into the lower end of the chamber produces a large volume of water vapor which rises rapidly to the top of the chamber, sweeping the droplets with it. Of course, the droplets are initially sprayed into the chamber at relatively low velocity, insufficient to reach the top of the chamber, and it is only the force of the expanding water vapor which sweeps these particles to the top. The top of the chamber 28 connects to a peripheral condenser zone 32 where the manifolds or galleries 34 and 36 provide cold water sprays 38 and 40 to condense the water vapor. The cold water from the depths of the body of water 12 is brought up through the conduit 42 by pump 44 and is directed through conduit 46 to the condensing section 32 of the unit. The mixed water of an intermediate temperature which is collected in the annular zone 48 is returned to an intermediate temperature level in the body of water 12 through conduit 48. For additional details relating to the structure of FIG. 1, reference is made to the prior U.S. Pat. No. 4,216,657, cited hereinabove.

It has also been proposed to direct water from the pump 44 into the chamber 28 at a point perhaps halfway up the structure, in a sheet adjacent the wall of the chamber 28, to start condensation of the water vapor after the water droplets have been accelerated and have attained the necessary velocity to reach the surface of the ocean. In such a case, the funnel shaped structure, particularly its upper portion need not diverge, but may be straight or somewhat convergent.

Now, with reference to the remaining figures of the drawings, the improved construction, illustrating the principles of the present invention, will be described.

Figure 3B:
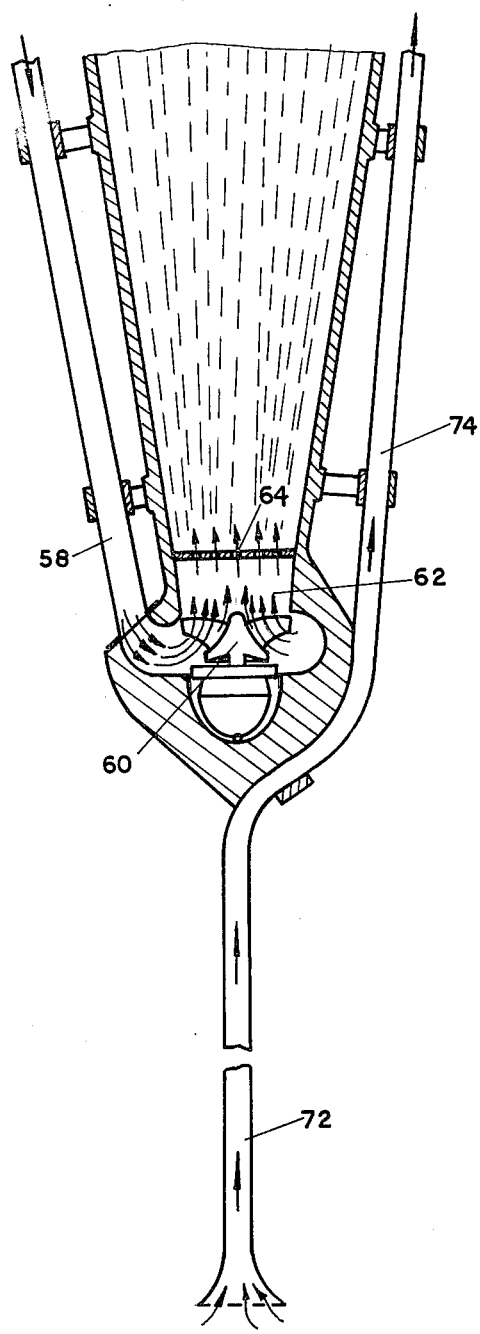

Referring to FIGS. 3A and 3B of the drawings, the hollow reinforced concrete structure 52 is shown floating in a body of water 54 which has warm surface water and cold water at substantial depths. As in the case of the embodiment shown in FIG. 1, warm surface water is drawn in at an intake 56 and dropped through the penstock 58 to a turbine 60. The turbine 60 is preferably of the Francis type, and the lower pressure output water from it is directed upwardly to the chamber 62 from which it is sprayed through the plate 64 into the lower end of the evacuated chamber 66. Incidentally, the chamber 66 is evacuated by the large vacuum pumps 68 of any suitable type which may be enclosed in the upper housing 70. A baffle plate 71 is provided to protect the input of the pumps 68 from the impingement of liquid water or spray. Cold water from the lower levels of the body of water 54 is channelled upwardly through the conduits 72 and 74 to the peripheral galleries 76 and 78; and from the galleries or manifolds 76 and 78 the cold water is sprayed in sheets parallel to the inner upper wall of the chamber 52 but spaced therefrom.

Incidentally, virtually all of the acceleration of the droplets sprayed through plate 64 takes place in the divergent region below the dashed line 80. With the cold water being sprayed in from the galleries 76 and 78, condensation of the water vapor starts to take place above the transverse line 80, and the upper section of the chamber 52 may therefore be convergent. It should be noted, of course, that in the lower section of the chamber 66, the droplets of water have been accelerated to a very high velocity sufficient to carry them substantially above the surface of the body of water 54, so that they may coast as they continue their upward path.

Incidentally, the conduit 82 is shown in phantom, lines, connected to the cold water conduit 74. This conduit 82 is merely shown for pedagogical purposes to indicate that the water pressure in conduit 74 would bring the water approximately to the point indicated by the arrow 84, perhaps two or three meters below the surface of the body of water 54, as a result of the difference in density of the colder water, as well as frictional losses resulting from flow through conduits 72 and 74. There is little pressure lost in the efficient nozzles by which the water from galleries 76 and 78 are sprayed upwardly along the walls of chamber 66, as indicated by the lines and arrows 86. Accordingly, if there were no other forces acting on the water sprayed from the galleries 76 and 78, it would stop at approximately the height indicated by the arrow 84. However, the droplets from the aperture plate 64 are travelling with considerable excess velocity, and this excess velocity is transmitted or transferred to the spray from galleries 76 and 78 as merging coalescence takes place, with the droplets being of very nearly equal velocity. Accordingly, the entire body of water becomes quite concentrated and substantially a stream of water with considerable bubbles and turbulence, owing to the presence of entrained air or non-condensible gas, as it passes through the conduit or guide element 88 mounted near the top of the structure 52 and aligned with the axis of the chamber 66. Non-condensible gas is efficiently collected and transported from throughout the chamber to this axial location because of the well-known ability of condensing vapor to move such gases to the point where the vapor vanishes by condensing. The gases are trapped and compressed in this region by the momentum of the converging water droplets, and are then efficiently further compressed and moved with the water into the upper gallery 90, being thereby effectively removed from the vacuum chamber. This collecting and pumping action greatly reduces the capacity and energy needed by the vacuum pumps 68, thus reducing the cost of building and operating the system.

Now, it may be noted that , as compared with the arrangement of FIG. 1, there is no need for a pump such as the pump 44 in FIG. 1 which brought the cold water up from lower ocean levels with sufficient pressure to reach the galleries or manifolds 34 and 36, as shown in FIG. 1. Accordingly, the cost of the unit has been decreased considerably by avoiding the need for this pump, and having the additional required kinetic energy supplied by the transfer of kinetic energy from the accelerated droplets sprayed into the chamber 66 through the spray plate 64. The system acts as a jet injector pump, which has a uniquely high efficiency in this application, so that the overall cold water pumping efficiency is higher than that of prior proposed arrangements.

Figure 4:
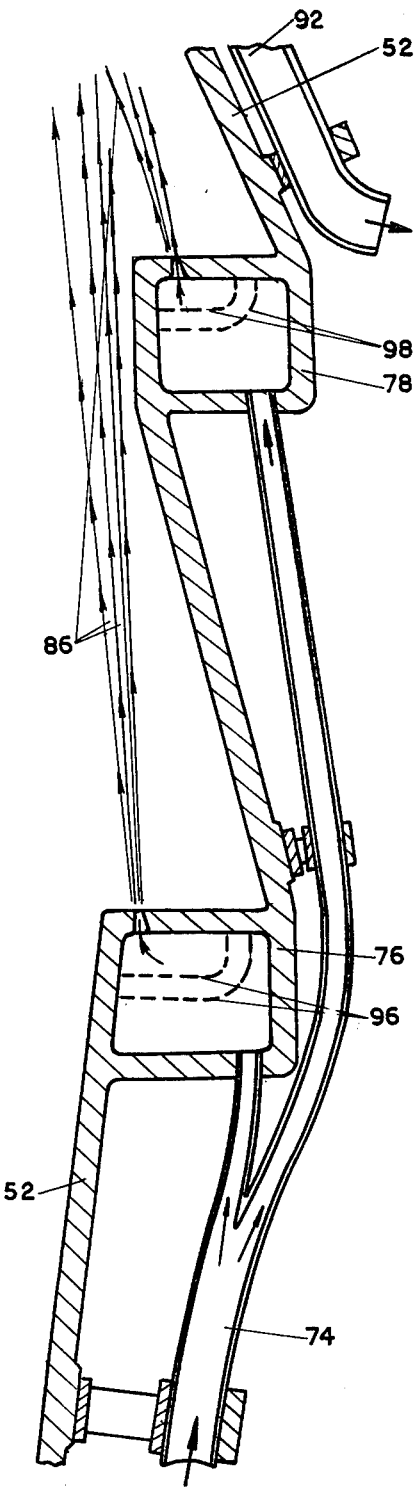
FIG. 4 is an enlarged cross-sectional view of a portion of FIG. 3A.

FIG. 4 is an enlarged view, partly in cross section, of a portion of the structure of FIGS. 3A and 3B. More specifically, the disclosed structure involves the galleries or manifolds 76 and 78 from which the cold water is sprayed along the sidewalls of the chamber 66. In this regard the cold water curtain 86 which is sprayed from the gallery 76 is particularly to be noted. Also shown in FIG. 4 are the turbulence control screens 96 and 98 in the galleries 76 and 78, respectively. These control screens 96 and 98 reduce transverse velocity in vicinities of the nozzles, thereby reducing undesired transverse velocity components which might impair the development of a smooth curtain of sprayed droplets of water extending, as indicated at reference numerals 86, parallel to the side wall of the structure.

Figure 5:
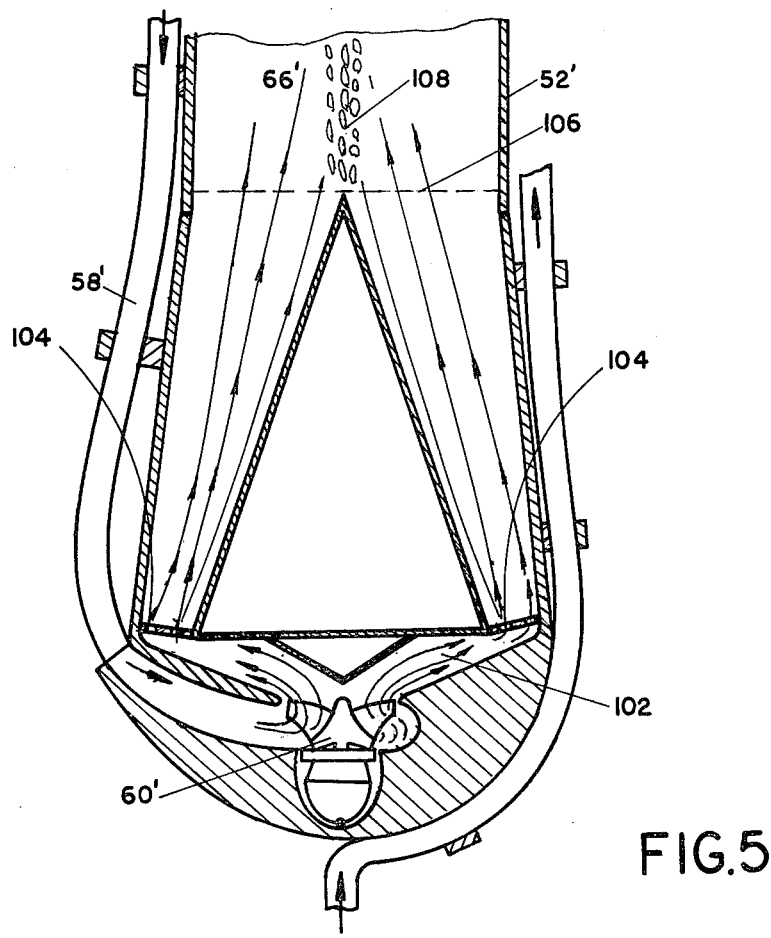
FIG. 5 represents an alternative configuration for the lower portion of the mist flow generator of FIGS. 3A and 3B.

FIG. 5 shows an alternative constructional configuration of the lower end of a mist flow generator of the type shown in FIG. 3B. In FIG. 5, the penstock of 58' directs warm water to the electric turbine generator unit 60' and the reduced pressure water from the turbine unit 60' enters the chamber 102 and is directed to the mist flow spray plates 104 which are spaced around the central axis of the structure 52'. In addition, the plates 104 may be tilted slightly from the perpendicular to direct the spray at a slight angle toward the axis of the structure 52 to intersect it well above the dashed line 106 as shown in FIG. 5. With the chamber 66' within the structure 52' being substantially evacuated, the very fine spray through the apertured plates 104 will again evaporate or boil, with the generation of water vapor from the warm droplets. This rapidly expanding water vapor will accelerate the fine water particles upwardly and they will reach a velocity by the time they reach the line 106 which will carry them well above the top of the structure, despite their initial relatively low velocity.

As a result of the convergent geometry of the structure shown in FIG. 5, the water deoplets included in the sprays originating with the various plates 104, will merge and coalesce to a significant extent along the axis of chamber 66', and this is indicated by reference numeral 108. The upper portion of the structure shown in FIG. 5 is as shown in FIG. 3A. Accordingly, with the cold water being introduced around the periphery, and the initial merging coalescing as shown at 108 in FIG. 5, the process of coalescence and condensation will be more easily accomplished as these two features are used in combination.

In passing, it is interesting to note that the sprays both from the galleries 76 and 78, and from the peripherally spaced mist flow spray plates 104 are directed upwardly and inwardly, and in both cases the initial velocity of the spray would be insufficient to carry the water all the way to the surface of the body of water 12 or to the top of the evacuated chamber.

Figure 6:
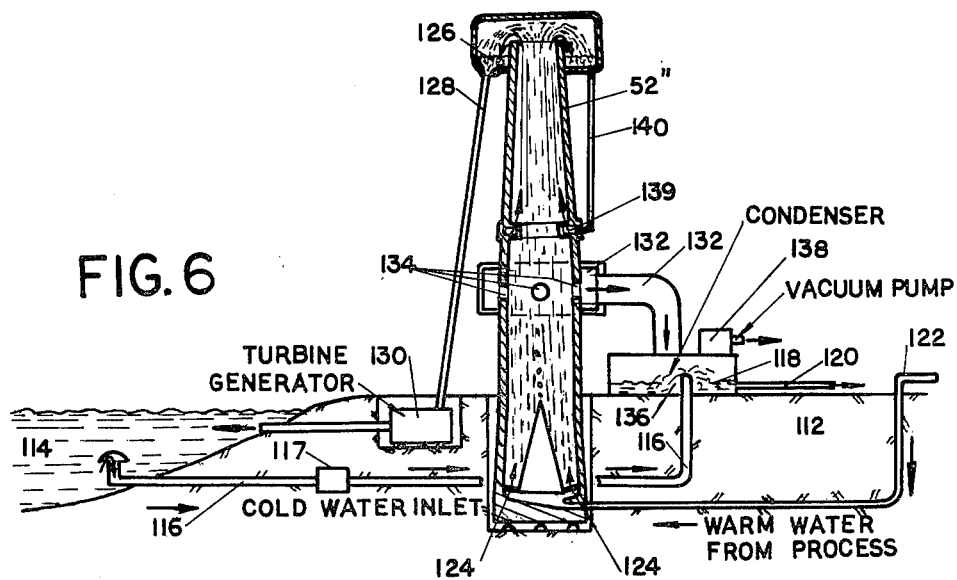
FIG. 6 is a showing of a land based system illustrating the principles of the present invention.

FIG. 6 shows the principles of the invention as applied to a land based thermal difference power generation system. The elevated chamber 52" is preferably located on land 112 immediately adjacent a large body of cold water 114. The cold water is drawn from the body of water 114 through pipe 116 by pump 117 and is routed to the condenser 118, and then through pipe 120 to an industrial process requiring considerable cooling. Warm water from the industrial process is routed to the structure 52" through the conduit 122. It is then sprayed upwardly into the bottom of the evacuated structure 52" from the mist flow spray plates 124. As in the case of other embodiments of the invention, the water is collected in an annular trough 126 and is directed through the penstock 128 to drive the turbine generator unit 130. A duct 132 draws water vapor from the structure 52" through the apertures 134. The water vapor is routed to the condenser 118 where the cold water spray 136 condenses the water vapor. A vacuum pump 139 serves to substantially evacuate the chamber 52".

Additional flow contol within the structure 51" may be provided by spraying a sheet of water upwardly along the inner surface of the chamber 52" from the gallery 138 fed by conduit 140. Using perhaps 10% of the water collected in the annular water receiving chamber 126, improved coalescing action of the upwardly directed droplets from spray plates 124, may be achieved. Again, as in the case of prior embodiments disclosed herein, the velocity of the spray from the ducts 132 would be insufficient to reach the upper end of the structure, in the absence of the higher velocity droplets which are accelerated up to full speed prior to reaching the level of the duct 132.

Incidentally, the plates 104 in FIG. 5 and 124 in FIG. 6 may form a complete annulus at the bottom of the chamber; or alternatively, a series of six or eight, for example, circular plates 124 may be provided with no intersection of the corresponding six or eight substantially conical or funnel-shaped chambers until close to the dashed line 106, see FIG. 5, or the corresponding point in FIG. 6.

Now, although dimensions, temperatures, and other similar parameters may be varied, it is useful to note some representative dimensions which could be employed. Initially, with regard to the size of the structure shown in FIGS. 3A and 3B, it is contemplated that it might extend for a distance in the order of 150 meters below the surface of the body of water, and that it might have an inner diameter at its widest point in the order of about 30 meters. The temperature several hundred meters below the surface of the ocean might be in the order of 5 degrees centigrade while that at the surface might be in the order of 25 degrees centigrade. The area of the mist flow spray element may be in the order of several hundred square meters, perhaps from 200 square meters to about 600 square meters, and this could apply both to the embodiment of FIG. 3B, and also to the arrangements of FIG. 5, where the apertured mist spray numbers 104 are located annularly, around the axis of the structure. Of course, the temperatures will vary in accordance with ambient conditions, and the size of the structure is of course dependent on the desired amount of output power and the quantities and the temperatures of warm and cold water which are available or which are being processed. A unit of this size will generate in the order of ten megawatts of electric power.

It is to be understood that the foregoing detailed description and the drawings represent illustrative exemplary embodiments of the invention. Variations from the indicated structure may of course be effected. Thus by way of example and not of limitation, instead of having two upwardly directed spray zones, a lesser or greater number may be employed. Also, the floating structure may be constructed of reinforced concrete, or other durable material having suitable exposed surface which will not be subject to undue corrosion by the water and the elements in contact with it. The conduits may be of any suitable material, including metal and reinforced structural plastic conduit or pipe. Valves, not shown in the drawings, would be included for flow control and to permit safe shut-down. The showings in the drawings in many cases are diagramatic and intended for ease in understanding the mode of operation. It is to be understood, therefore, that the present invention is not limited to that precisely as shown in the drawings as described hereinabove.

What is claimed is:

1. An apparatus for generating power from thermal differences in water supplies comprising:
   intake means for receiving water from a warm source of water;
   dispersion means for producing a mist from said warm water in the form of warm water or brine droplets dispersed in water vapor formed by partial evaporation or boiling from the droplets, with vapor being the continuous phase;
   guiding and containing means of substantial vertical extent for receiving the mist from the dispersing means and conducting it in an upward direction under the influence of a difference in vapor pressure between the main portion of said guiding and containing means and the lower end thereof adjacent the dispersion means;
   means for condensing said water vapor coupled to said guiding and containing means at a point along its height following acceleration of the warm water droplets to a velocity sufficient to reach the upper end of the guiding and containing means;
   collecting means for receiving the droplets of water at the higher elevation near the upper end of said guiding and containing means;
   said guiding and containing means having a cross-sectional area near the upper end thereof approximately equal to or less than the cross-sectional area of said guiding and containing means near the center thereof;
   evacuation means for removing noncondensable gases from the guiding and containing means;
   power generating means for harnessing the difference of head produced by raising the water in said guiding and containing means; and
   said apparatus including means for spraying water upward into said guiding and containing means at a significant angle inclined toward the axis thereof with said droplets initially having insufficient velocity along the axis of said guiding and containing means to reach the upper end thereof.

2. An apparatus as defined in claim 1 wherein said apparatus includes means for spraying water into said guiding and containing means substantially parallel to the walls thereof in the upper section thereof, with said water being sprayed in with an initial velocity insufficient to reach the upper end of said guiding and containing means.

3. An apparatus as defined in claim 1 wherein said dispersion and mist producing means are spaced outwardly from the axis of said guiding and containing means to direct droplets upward and inward toward the axis of said guiding and containing means.

4. An apparatus as defined in claim 2 wherein said collecting means includes converging means discharging into a separate liquid water receiving chamber connected to said evacuation means.

5. An apparatus as defined in claim 4 wherein means are provided for conducting water downward from said receiving chamber.

6. An apparatus as defined in claim 1 wherein said warm water intake means is located near the top of said guiding and containing means for receiving warm water from the surface of a body of water; and extended conduit means are provided for bringing cold water from the depths of said body of water, for condensing said water vapor.

7. An apparatus as defined in claim 1 wherein said warm water intake means is located near the top of said guiding and containing means, and wherein conduit means are provided for directing the warm water received at said inlet to said power generating means located near the bottom of said guiding and containing means.

8. An apparatus as defined in claim 1 wherein said warm water intake means is located near the base of said guiding and containing means and warm water from said intake is directed to said dispersion means.

9. An apparatus as defined in claim 2 wherein means are provided for supplying cold water to said spraying means.

10. An apparatus as defined in claim 1 wherein the cross-sectional area near the top of said guiding and containing means is substantially less than its cross-sectional area approximately half way between the top and the bottom thereof.

11. An apparatus for generating power from thermal differences in water supplies comprising:
   intake means for receiving water from a warm source of water;
   dispersion means for producing a mist from said warm water in the form of warm water or brine droplets dispersed in water vapor formed by partial evaporation or boiling from the droplets, with vapor being the continuous phase;
   guiding and containing means of substantial vertical extent for receiving the mist from the dispersing means and conducting it in an upward direction under the influence of a difference in vapor pressure between the main portion of said guiding and containing means and the lower end thereof adjacent the dispersion means;
   means for condensing said water vapor coupled to said guiding and containing means at a point along its height following acceleration of the warm water droplets to a velocity sufficient to reach the upper end of the guiding and containing means;

collecting means for receiving the droplets of water at the higher elevation near the upper end of said guiding and containing means;

evacuation means for removing noncondensable gases from the guiding and containing means;

means for utilizing the difference of head produced by raising the water in said guiding and containing means; and said apparatus including means for spraying water upward into said guiding and containing means at a substantial angle inclined toward the axis thereof with said droplets initially having insufficient velocity along the axis of said guiding and containing mans to reach the upper end thereof;

means for mounting said guiding and containing means on land, means for drawing cold water from a nearby body of water and supplying said cold water to said condensing means, and means for withdrawing said water vapor from said guiding and containing means at an intermediate point along the height of said guiding and containing means following acceleration of the droplets of water to a velocity sufficient to reach the upper end of said guiding and containing means and for directing said water vapor to said condensing means.

12. An apparatus as defined in claim 11 wherein said collecting means includes converging means discharging into a separate liquid water receiving chamber connected to said evacuation means.

13. An apparatus for generating power from thermal differences in water supplies comprising:

intake means for receiving water from a warm source of water;

dispersion means for producing a mist from said warm water in the form of warm water or brine droplets dispersed in water vapor formed by partial evaporation or boiling from the droplets, with vapor being the continuous phase;

guiding and containing means of substantial vertical extent for receiving the mist from the dispersing means and conducting it in an upward direction under the influence of a difference in vapor pressure between the main portion of said guiding and containing means and the lower end thereof adjacent the dispersion means;

means for condensing said water vapor coupled to said guiding and containing means at a point along its height following acceleration of the warm water droplets to a velocity sufficient to reach the upper end of the guiding and containing means;

collecting means for receiving the droplets of water at the higher elevation near the upper end of said guiding and containing means;

evacuation means for removing noncondensable gases from the guiding and containing means;

power generating means for harnessing the difference of head produced by raising the water in said guiding and containing means; and said apparatus including means for spraying cold water droplets upward into said guiding and containing means at a substantial angle inclined toward the axis thereof substantially parallel to the walls thereof in the upper section thereof.

14. An apparatus as defined in claim 13 wherein a plurality of said cold water spraying means are provided at respectively different elevations along the height of said guiding and containing means.

15. An apparatus as defined in claim 13 wherein said warm water intake means is located near the top of said guiding and containing means for receiving warm water from the surface of a body of water; and extended conduit means are provided for bringing cold water from the depths of said body of water to said cold water spraying means.

16. An apparatus as defined in claim 13 wherein said warm water intake means is located near the top of said guiding and containing means, and wherein conduit means are provided for directing the warm water received at said inlet to said power generating means located near the bottom of said guiding and containing means.

17. An apparatus for generating power from thermal differences in water supplies comprising:

intake means for receiving water from a warm source of water;

dispersion means for producing a mist from said warm water in the form of warm water or brine droplets dispersed in water vapor formed by partial evaporation or boiling from the droplets, with vapor being the continuous phase;

guiding and containing means of substantial vertical extent for receiving the mist from the dispersing means and conducting it in an upward direction under the influence of a difference in vapor pressure between the main portion of said guiding and containing means and the lower end thereof adjacent the dispersion means;

means for condensing said water vapor coupled to said guiding and containing means at a point along its height following acceleration of the warm water droplets to a velocity sufficient to reach the upper end of the guiding and containing means;

collecting means for receiving the droplets of water at the higher elevation near the upper end of said guiding and containing means;

evacuation means for removing noncondensable gases from the guiding and containing means;

power generating means for harnessing the difference of head produced by raising the water in said guiding and containing means; and characterized in that said apparatus includes means for spraying water upward into said guiding and containing means at a significant angle inclined toward the axis thereof with said droplets initially having insufficient velocity along the axis of said guiding and containing means to reach the upper end thereof; and said apparatus including means for mounting said guiding and containing means on land, means for drawing cold water from a nearby body of water and supplying said cold water to said condensing means, and means for withdrawing said water vapor from said guiding and containing means at an intermediate point along the height of said guiding and containing means following acceleration of the droplets of water to a velocity sufficient to reach the upper end of said guiding and containing means and for directing said water vapor to said condensing means.

18. An apparatus for generating power from thermal differences in water supplies comprising:

intake means for receiving water from a warm source of water;

dispersion means for producing a mist from said warm water in the form of warm water or brine droplets dispersed in water vapor formed by partial evaporation or boiling from the droplets, with vapor being the continuous phase;

guiding and containing means of substantial vertical extent for receiving the mist from the dispersing means and conducting it in an upward direction under the influence of a difference in vapor pressure between the main portion of said guiding and containing means and the lower end thereof adjacent the dispersion means;

means for condensing said water vapor coupled to said guiding and containing means at a point along its height following acceleration of the warm water droplets to a velocity sufficient to reach the upper end of the guiding and containing means;

collecting means for receiving the droplets of water at the higher elevation near the upper end of said guiding and containing means;

evacuation means for removing noncondensable gases from the guiding and containing means;

power generating means for harnessing the difference of head produced by raising the water in said guiding and containing means;

characterized in that said apparatus includes means for spraying water upward into said guiding and containing means at a significant angle inclined toward the axis thereof with said droplets initially having insufficient velocity along the axis of said guiding and containing means to reach the upper end thereof; and said apparatus including a plurality of means for spraying water into said guiding and containing means substantially parallel to the walls thereof in the upper section thereof, with said water being sprayed in with an initial velocity insufficient to reach the upper end of said guiding and containing means, said plurality of spraying means being located at respectively different elevations along the height of said guiding and containing means.

19. An apparatus for generating power from thermal differences in water supplies comprising:

intake means for receiving water from a warm source of water;

dispersion means for producing a mist from said warm water in the form of warm water or brine droplets dispersed in water vapor formed by partial evaporation or boiling from the droplets, with vapor being the continuous phase;

guiding and containing means of substantial vertical extent for receiving the mist from the dispersing means and conducting it in an upward direction under the influence of a difference in vapor pressure between the main portion of said guiding and containing means and the lower end thereof adjacent the dispersion means;

means for condensing said water vapor coupled to said guiding and containing means at a point along its height following acceleration of the warm water droplets to a velocity sufficient to reach the upper end of the guiding and containing means;

collecting means for receiving the droplets of water at the higher elevation near the upper end of said guiding and containing means;

evacuation means for removing noncondensable gases from the guiding and containing means;

power generating means for harnessing the difference of head produced by raising the water in said guiding and containing means;

characterized in that said apparatus includes means for spraying water upward into said guiding and containing means at a significant angle inclined toward the axis thereof with said droplets initially having insufficient velocity along the axis of said guiding and containing means to reach the upper end thereof;

said apparatus including means for spraying water into said guiding and containing means substantially parallel to the walls thereof in the upper section thereof, with said water being sprayed in with an initial velocity insufficient to reach the upper end of said guiding and containing means; and conduit means for supplying water to said spraying means from said collecting means.

* * * * *